(12) United States Patent
Audityan et al.

(10) Patent No.: US 6,317,806 B1
(45) Date of Patent: Nov. 13, 2001

(54) STATIC QUEUE AND INDEX QUEUE FOR STORING VALUES IDENTIFYING STATIC QUEUE LOCATIONS

(75) Inventors: Srinath Audityan; Thomas Albert Petersen; Robert Charles Podnar, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,612

(22) Filed: May 20, 1999

(51) Int. Cl.[7] .................................................. G06F 12/00
(52) U.S. Cl. ........................ 711/101; 711/109; 711/156; 711/158; 711/146; 711/167
(58) Field of Search ................................ 711/109, 156, 711/158, 146, 167, 101; 710/57

(56) References Cited

U.S. PATENT DOCUMENTS

| | | | | |
|---|---|---|---|---|
| 5,404,562 | * | 4/1995 | Heller et al. | 712/18 |
| 5,875,472 | * | 2/1999 | Bauman et al. | 711/150 |
| 6,178,466 | * | 1/2001 | Gilbertson et al. | 710/3 |

* cited by examiner

Primary Examiner—Reginald G. Bragdon
(74) Attorney, Agent, or Firm—Anthony V. S. England; Russell D. Gulbertson; Shaffer & Culbertson

(57) ABSTRACT

A queuing apparatus associated with a processor includes at least one static queue (11), an index generator (34), at least one index queue (37), and a static queue accessing arrangement. Each static queue (11) has a number of static queue locations (12), each for storing a static queue entry and an availability indicator (14) for indicating an availability status of the respective static queue location. The index generator (34) uses information from the static queue (11) to provide a unique index value for each static queue entry, the index value for a particular static queue entry identifying the static queue location (12) containing the particular static queue entry. Each index queue (37, 42) has a number of index queue locations (40), each for storing one of the index values provided by the index generator (34). The static queue accessing arrangement retrieves a selected index value from a particular index queue location (40), and uses the selected index value to retrieve the static queue entry with which the selected index value is associated. Multiple index queues (37, 42) facilitate prioritization of static queue entries, and reprioritization by transferring index queue values from one index queue to another. The index queues (37, 42) also facilitate compaction of unnecessary static queue entries.

25 Claims, 3 Drawing Sheets

STATIC QUEUE AND INDEX QUEUE FOR STORING VALUES IDENTIFYING STATIC QUEUE LOCATIONS

TECHNICAL FIELD OF THE INVENTION

The invention relates to data processing systems and, more particularly, to an apparatus and method for controlling a static queue used in a data processing system.

BACKGROUND OF THE INVENTION

Data processing systems, including microprocessors, may use queues for temporarily storing information prior to being transferred to some other resource in the system. Each queue comprises a series of registers of suitable width for the information which they are to store temporarily. Each register represents a location in the queue. The information which may be stored in a queue location may comprise memory address information, data, or control information. Regardless of the number of locations in a particular queue and the width of each location, some mechanism must be associated with the queue for selecting a particular location so that the information stored in that location may be transferred to another resource in the system.

A queue may be operated to shift the stored information from one queue location to the next. This shifting operation may be used to control how the stored information is transferred from the queue to the next resource in the system. For example, queue entries may shift down through the locations in a queue, with each entry moving to the next location in the queue on the occurrence of an event such as a clock cycle. Upon the occurrence of each event, the entry in the last queue location exits the queue and the first queue location receives a new queue entry. Alternatively, a queue may be operated to hold information in a single location until the information is selected to be transferred to another resource in the system. These static queues must include some mechanism by which a particular queue location may be selected.

A queue may be used in a data processing system to hold address, data, and control information associated with a number of outstanding or pending store transactions. Store transactions which may be held in the queue include write-through stores, pushes, interventions, castouts, cache control operations, and barrier instructions.

Referring still to the store example, it is desirable to prioritize transactions in the queue to ensure that certain transactions are transferred on for processing earlier than other transactions which may have been stored in the queue. A castout transaction from one processor, for example, is preferably transferred from the queue more quickly when another processor requests the information stored at the address specified by the castout transaction. It is also desirable to eliminate certain transactions from the queue to prevent the transactions from being passed on to the next processing step. For example, where a castout transaction is to be stored in the queue specifies an address which is the same address as that specified in an older castout transaction already resident in the queue, in this case the older transaction represents a transaction with stale data. It is, therefore, desirable to remove such a castout transaction from the queue in order to prevent the transaction from being finished unnecessarily only to be overwritten by the newer castout transaction.

Prior data processing systems have used a priority bit in each queue location to differentiate between the priorities of different transactions in the queue. Arbitration logic associated with these systems used the priority bits to schedule the transactions for transfer from the queue. However, the larger the queue, the more complex the arbitration logic required to implement a priority bit scheme.

A store transaction queue may be implemented as a dynamic queue in which transactions shift from one location to the next in each clock cycle or other event. However, shifting large amounts of data in the queue causes power dissipation and does not facilitate prioritization of transactions in the queue.

SUMMARY OF THE INVENTION

It is an object of the invention to provide an apparatus and method for efficiently queuing information in a processor. Another object of the invention is to provide for more efficient use of system resources by prioritizing queue entries and facilitating reprioritization as desired, and by removing certain types of transactions to prevent them from consuming system resources.

The queuing apparatus according to the invention includes at least one static queue and at least one index queue. The index queue or queues are used to retrieve entries from the static queue or queues. By using index queues to control the static queues, information may be transferred from the static queues without the power dissipation inherently associated with shifting large amounts of data within the queues. Also, multiple index queues may be used to ensure that higher priority static queue entries are transferred from the static queues earlier than lower priority entries. The queuing arrangement according to the invention may also be implemented to facilitate the reprioritization of a static queue entry based upon events which may occur after the entry is stored in a static queue.

The queuing apparatus includes a static queue having a plurality of static queue locations. Each static queue location is adapted to store a static queue entry. Also, each static queue location includes an availability indicator, preferably an availability bit, which is used to indicate an availability status of the respective static queue location. An index generator is associated with the static queue and provides a unique index value or pointer for each static queue entry. The index value for a particular static queue entry identifies the static queue location containing the particular static queue entry. For example, a static queue according to the invention may have eight queue locations, identified as locations zero through seven. The index for the particular static queue entry currently stored in static queue location five, for example, may comprise the binary representation for the number five, that is, 101.

Each index queue includes a plurality of index queue locations. Each index queue location is adapted for storing one of the index values provided by the index generator. Also, each index queue location preferably includes a position for an index value validity indicator. Since each index queue location stores only an index value and perhaps a validity indicator, each index queue location may be relatively small compared with a location in the static queue. For an eight-location static queue, each index queue location may include only four bits, three bits for storing the respective index value and one bit for the validity indicator.

The queuing system according to the invention also includes a static queue accessing arrangement. The static queue accessing arrangement retrieves a selected index value from a particular index queue location and uses the selected index value to retrieve the static queue entry with which the index value is associated. Once the static queue entry is retrieved from the static queue, the static queue accessing arrangement also preferably marks the static queue location from which the entry was retrieved as being available for storing a new static queue entry. The static queue location may be marked by changing the availability indicator to an "available" status.

In a preferred form of the invention a plurality of index queues are used to control the static queue. Each index queue is reserved for index values associated with a certain priority level. For example, the queuing arrangement may include two separate index queues, a first index queue for storing index values associated with low priority static queue entries, and a second index queue for storing index values associated with high priority static queue entries. In this preferred form of the invention, the apparatus also includes queue selection logic for selecting the index queue from which the next index value is to the retrieved. Location selection logic is also included for selecting a particular location within the selected index queue.

For example, each index queue may comprise a first-in-first-out queue in which the entries in the queue shift down one index queue location each time an index queue entry is removed from a bottom index queue location. In this case, the queue selection logic may always select the highest priority index queue if the entry in the bottom location of that queue is a valid entry. If the index value in the bottom location of the highest priority index queue is marked "invalid," the queue selection logic selects the next lowest priority index queue. In either instance, the location selection logic in this case selects the bottom location in the selected index queue.

In one preferred form of the invention, the queuing apparatus includes an index queue transfer arrangement which may transfer an identified index value from one index queue to a different index queue. Where each index queue is reserved for index values associated with a particular priority level, this transfer represents a reprioritization of the index value and the static queue entry associated with the index value.

The preferred index queue transfer arrangement includes a static queue comparator for detecting priority affecting information directed to the static queue. An example of priority affecting information which may be directed to the static queue comprises a snoop transaction in which a processor indicates that it desires control of data at a certain address. In this case the static queue comparator arrangement compares the address specified in the snoop transaction with each address in a static queue location to identify any matching static queue entry. A match between the address specified in the snoop transaction and an address in a static queue entry indicates that the static queue entry, which many have a relatively low priority, affects information desired by another system resource. The static queue entry should thus be reprioritized as having a higher priority.

An index queue comparator arrangement uses the matching information from the static queue comparator arrangement to locate the identified index value in the low priority index queue. This identified index value comprises the index value associated with the static queue entry which was matched by the snoop transaction. Once the identified index value is located in the low priority index queue, an index queue invalidating arrangement associated with the low priority index queue invalidates the index value, preferably by toggling the validity bit associated with the index value. Also, a transfer control arrangement receives the identified index value from the index queue and causes the identified index value to be stored in a second, higher priority index queue.

In the preferred form of the invention, the transfer control arrangement uses a "dead cycle" at the static queue to insert the reprioritized index value into the high priority index queue. This "dead cycle" comprises a clock cycle in which no valid entry is stored in the static queue. Since the snoop transaction is not stored in the static queue, the particular clock cycle in which the snoop transaction reaches the static queue represents a "dead cycle." Thus, the index value being reprioritized may be stored in the high priority index queue in this "dead" clock cycle with no danger of conflict with another index value provided by the index generator.

To coordinate the insertion of the reprioritized index value with the static queue "dead cycle," the transfer control arrangement may include a number of synchronizing pipeline stages. The number of synchronizing pipeline stages is chosen so that the index value which is being reprioritized from the low priority index queue is available for insertion into the high priority index queue in the same clock cycle that the snoop transaction exits any pre-queue pipeline associated with the static queue.

Another advantage of the queuing system according to the invention is that the system facilitates the use of a queue compacting arrangement. This queue compacting arrangement invalidates static queue entries for discardable transactions or information, and also invalidates the respective index value for each such discardable transaction. In this sense, the term "compacting" is used to mean that the arrangement reduces static queue entries.

The queue compacting arrangement uses a static queue comparator and an index queue comparator similarly to those elements of the index queue transfer arrangement. However, rather than transferring an index value from one index queue to another, the comparator arrangements are used to invalidate the index value associated with a "duplicate transaction" stored in the static queue. Such a duplicate transaction comprises an older transaction which specifies the same address as a newer transaction. The invalidated index value is never used to retrieve the associated static queue entry. Also, the queue compacting arrangement uses the static queue comparator output to change the availability status of the static queue location holding the duplicate transaction to an "available" status. This change to an "available" status leaves the respective static queue location available for being overwritten with another static queue entry.

These and other objects, advantages, and features of the invention will be apparent from the following description of the preferred embodiments, considered along with the accompanying drawings.

DESCRIPTION OF THE PREFERRED EMBODIMENTS

Figure 1:
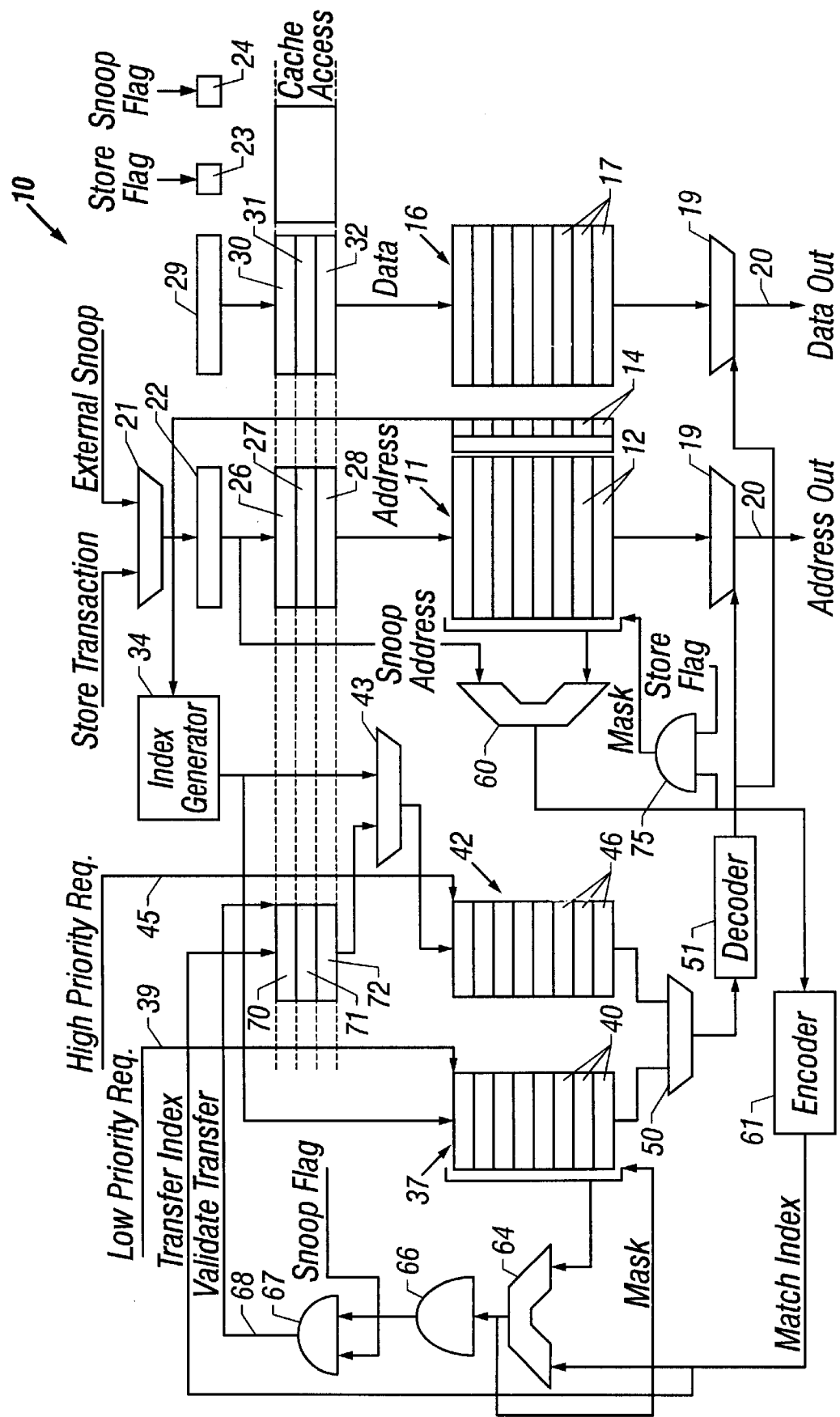
FIG. 1 is a diagrammatic representation of a queuing arrangement embodying the principles of the invention.

FIG. 1 shows one form of queuing arrangement 10 embodying the principles of the invention. The illustrated queuing arrangement 10 is adapted for temporarily storing or queuing store-type instructions or transactions bound for main memory in a microprocessor system. Queuing arrangement 10 is shown only for purposes of illustrating the invention. Those skilled in the art will appreciate that the queuing principles embodied in queuing arrangement 10 are not limited to this particular application, but may be applied in numerous other situations in which information is queued before being transferred to other processor resources.

The form of the invention shown in FIG. 1 includes two separate static queues. A first static queue 11 comprises an address queue which includes a plurality of queue locations 12, eight locations in this illustrated example. Each queue location 12 comprises a register having a width sufficient for storing the desired information. For example, the illustrated address queue 11 may include locations 12 comprising eight byte registers. In any event, each location 12 in static queue 11 is adapted for storing an entry comprising an address specified in a store-type transaction. Each queue location 12 also includes one place or bit 14 reserved for indicating the availability of the particular location. The status of this availability bit 14 indicates whether or not the respective location 12 is available for storing a new entry. Information is only written into a queue location 12 which is shown as "available" by the availability bit 14. Also, when information is written into a first static queue location 12, the availability bit 14 is toggled to an "unavailable" status.

The second queue 16 in the illustrated example comprises a data queue for storing data associated with an address specified in a store-type instruction. Second queue 16 includes queue locations 17 equal in number to the locations 12 in address queue 11. As in address queue 11 each location 17 comprises a register of a suitable width, for example thirty-two bytes. Each queue location 17 in data queue 16 corresponds to a location in address queue 11. For example, if an entry is stored in location "five" in address queue 11, the data associated with the address will be stored in location "five" of data queue 16. Thus, data queue 16 in this example does not require an availability indicator. The status information associated with a location 12 in address queue 11, specifies the status of the corresponding location 17 in data queue 16.

Static queues 11 and 16 may be considered a single queue since the various queue locations are logically related, although may be physically distinct. It will be appreciated that other forms of the queuing arrangement may include any number of static queues, each having different numbers of locations. Also, the invention does not require correspondence between locations in the various static queues. The various queue locations may be entirely unrelated and may each include an availability indicator which indicates the availability status of the respective location. These alternate forms of the invention are to be considered equivalent to the form shown in the drawings for purposes of example.

Static queues 11 and 16 each include a location selecting multiplexer 19. Each location selecting multiplexer 19 is used to select a particular queue location in the respective static queue so that the entry in the particular queue location is driven or transferred to some other resource (not shown) in the processing system through output lines 20. The operation of static queue selecting multiplexers 19 will be discussed in further detail below.

The form of the invention shown in FIG. 1 also includes an arbitration multiplexer 21 for arbitrating between store-type transactions and external snoop transactions, that is, snoop queries from a different processor in the multiprocessor system. Whether arbitration multiplexer 21 selects a store-type transaction or a snoop transaction, the address specified in the transaction is stored in an address latch 22.

In addition to address latch 22, latch 23 is provided for latching a store indicating flag and latch 24 is provided for latching a snoop indicating flag. The state of the store indicating flag in latch 23 indicates whether the address at latch 22 is associated with a store-type transaction, while the state of the snoop indicating flag in latch 24 indicates whether the address at latch 22 is associated with a snoop transaction. This information stored in latches 22, 23, and 24 is used in the index value transfer arrangement and queue compacting arrangement described below.

Since the illustrated form of the invention is directed to store-type transactions which specify both an address and data, and since the specified data may need to be retrieved for storage in static data queue 16, the embodiment shown in FIG. 1 includes a number of pre-static queue pipeline stages 26, 27, and 28. In the illustrated example, a store-type transaction stored in the address latch 22 may require that the data for the specified address be accessed from the storing processor's cache memory. The cache memory access cycle may require three clock cycles. Address pipeline stages 26, 27, and 28 hold the store-type transaction address and other information until the subject data is retrieved from the storing processor's cache and available for storage in data queue 16. Thus the store-type transaction address and the specified data are written to the same location in the respective static queue 11 and 16 in the same clock cycle.

For store-type transactions which do not specify data which must be retrieved by a cache access, queuing arrangement 10 includes a data latch 29 and data pipeline stages 30, 31, and 32. Data pipeline stages 30, 31, and 32 correspond to address pipeline stages 26, 27, and 28.

Queuing arrangement 10 also includes an index generator 34. Index generator 34 receives availability bit information from first static queue 11 and produces an index value which points to or identifies to the particular queue location 12 which receives an entry in a particular clock cycle. In this way, an index value provided by index generator 34 is associated with a particular static queue entry.

The form of the invention illustrated in FIG. 1 includes two separate index queues. A first index queue 37 comprises a low priority index queue and is reserved for index values associated with a low priority entry in static address queue 11. An index value is validated in low priority index queue 37 with a low priority request signal on line 39. The second index queue 42 comprises a high priority index queue and is reserved for index values associated with a high priority entry in static address queue 11. The high priority index queue 42 has an input multiplexer 43 to select between an index value from index generator 34 or an index value from the index value transfer or reprioritization arrangement discussed below. An index value is validated in high priority index queue 42 with a high priority request signal on line 45. The high priority and low priority request signals may be generated by source control logic (not shown) associated with the system 10. Also, the high priority request signal on line 45 may be generated by the index value transfer arrangement discussed below.

Low priority index queue 37 in the illustrated form of the invention includes eight queue locations 40, while high priority index 42 includes eight queue locations 46. Each queue location 40 and 46 comprises a register having a size sufficient to store an index value provided by index generator 34 along with any associated information. For example, for the static queue 11 which includes eight different locations 12 that must be identified, the index queue locations may include three bits for storing the index value identifying a particular static queue location and a validity bit which indicates whether that particular index value is valid. Thus, the index queues 37 and 42 may be made up of much smaller registers than the relatively large registers required in the static address queue 11 and static data queue 16.

In one preferred form of the invention index queues 37 and 42 are both first-in-first-out queues in which queue entries shift down to the next queue location 40 or 46 each time an entry is removed from the bottom queue location. This downward shift in queue locations deallocates a location 40 or 46 in the respective queue thereby making it available for a new entry. Although this first-in-first-out, trickle down-type queue comprises a preferred implementation for index queues 37 and 42, the invention is not limited to this or any other particular queue location selection logic and related logic for controlling the index queues.

An exit multiplexer 50 is connected to both index queues 37 and 42, and provides an output to a decoder 51 which, in turn, provides control signals to the static queue location selection multiplexers 19. Exit multiplexer 50, decoder 51, and the location selection multiplexers 19 each form part of a static queue accessed arrangement. These elements together with the queue location selection logic in the index queues 37 and 42 operate together to first retrieve a selected index value from one of the index queues and then use the index value to retrieve the associated entry in the static queues 11 and 16.

Exit multiplexer 50 selects one of the index queues 37 or 42 and passes one index value each clock cycle to decoder 51. To facilitate transferring high priority transactions more quickly than low priority transactions, queue selection logic may be biased in favor of the high priority index queue 42. For example, the queue selection logic associated with exit multiplexer 50 may choose the index value from the selected location 46 of the high priority index queue 42 whenever the selected location comprises a valid index value. If the selected location 46 of the high priority index queue 42 does not hold a valid index value, then an index value is taken from a location 40 of the low priority index queue 37 according to the location selection logic employed by the low priority queue.

Figure 2:
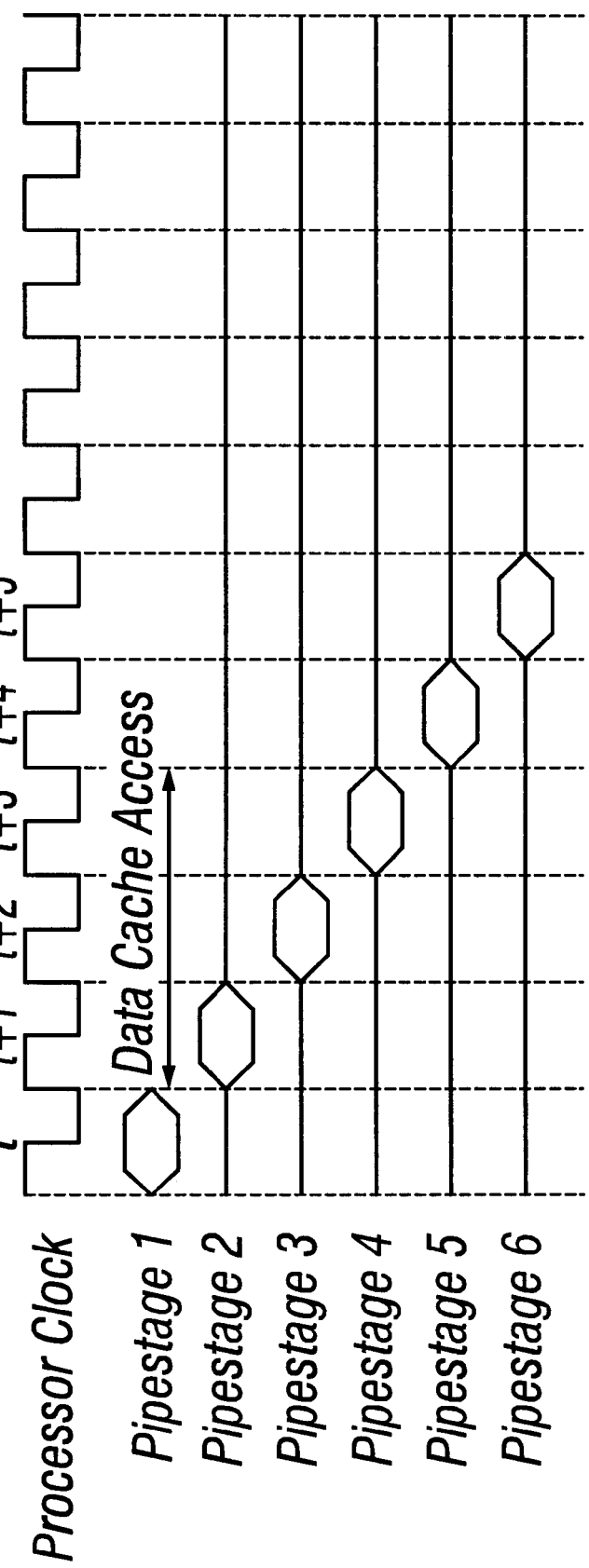
FIG. 2 is a timing chart showing a single store-type transaction entering the queuing system shown in FIG. 1.

The basic operation of the queuing arrangement 10 and the queuing method according to the invention may be described with reference to FIGS. 1 and the timing chart shown in FIG. 2. FIG. 2 illustrates a single store-type transaction entering the queuing system shown in FIG. 1. In a first clock cycle "t" shown in FIG. 2, arbitration multiplexer 21 receives the address specified by the store-type transaction and passes the address to address latch 22. Any data which is already associated with the store-type operation is stored in data latch 29, and the store identifying flag 23 is set to indicate that the transaction is a store-type transaction. In the next clock cycle, cycle "t+1" in FIG. 2, the address specified in the store-type transaction is transferred from address latch 22 to the next address pipeline stage 26. If data specified by the address must be accessed from another resource (from cache, for example), the data access cycle also begins in clock cycle "t+1" in the illustrated form of the invention. In clock cycle "t+2" the specified address is held at pipeline stage 26, in clock cycle "t+3" the address is held at pipeline stage 27, and in clock cycle "t+4" the address is transferred to the final pipeline stage, stage 28. In the next clock cycle, cycle "t+5" in FIG. 2, the address is written as an entry into an available location 12 in static address queue 11. In the same clock cycle, the data which is either returned from the cache access cycle or transferred down through stages 30, 31, and 32, is written into the corresponding location 17 in static data queue 16. For example, the fifth location 12 in static address queue 11 may have been marked as available and therefore chosen for storing the new store-type transaction. The data corresponding with the store-type transaction is therefore stored in the fifth location 17 of static data queue 16 in the preferred form of the invention.

In clock cycle "t+4," the clock cycle during which the address for the store-type transaction is about to be stored in static address queue 11, index generator 34 uses the availability bit information from the static address queue to produce an index value which points to or identifies the particular location 12 in which the address will be stored. In the example described above in which the address is stored in the fifth location 12 of static address queue 11, the index value may comprise the binary representation "101" which specifies the fifth location in the static address queue.

Depending upon which priority is associated with the particular store-type transaction, either low priority request line 39 or high priority request line 45 will be driven "asserted" in cycle "t+4" and the index value provided by index generator 34 is stored in one of the index queues 37 or 42. For example, assume that the store-type transaction we are tracking through the queuing arrangement 10 comprises a high priority transaction. In this case, line 45 will be driven "asserted" and the index value is stored in a location 46 in high priority index queue 42. Where the index queue 42 is implemented as a trickle down-type queue, the index value is stored in the location 46 immediately above the top unavailable location of index queue 42.

In some subsequent clock cycle the static queue access arrangement associated with the index queues 37 and 42 uses this stored index value to access and retrieve the store-type transaction address from static address queue 11 and transfer the information to another resource in the processor in which queuing arrangement 10 is implemented. Continuing with the above example in which the index value is stored in high priority queue 42, at some subsequent clock cycle, the subject index value will have shifted down to the bottom location of the high priority index queue. Since, in the illustrated form of the invention, exit multiplexer 50 always selects the bottom location of high priority index queue 42 if that location includes a valid index value, the exit multiplexer passes the exemplary index value to decoder 51. Decoder 51 decodes the index value into a bit mask which is directed to both static queue location selection multiplexers 19. This bit mask causes each multiplexer 19 to enable the fifth location in the respective static queue 11 and 16, and causes the information in that respective location to be driven through output lines 20 to the another resource in the processing system. When the information is read from the fifth location 12, logic associated with static address queue 11 may toggle the availability indicator, that is, availability bit 14, to an "available" status. This "available" status indicates that the information or entry at that location is no longer current information and that the location may be overwritten with a new entry. Other forms of the invention may leave the availability indicator in an "unavailable" status until some later time. Leaving the availability indicator showing an "unavailable" status allows the particular location to be accessed again, which may be advantageous in certain circumstances.

The queuing arrangement 10 provides several advantages. First, the queues which hold large amounts of data, queues 11 and 16, are static queues and thus dissipate relatively little power in each clock cycle. The small index queues 37 and 42 employ relatively simple logic to not only control access to static queues 11 and 16, but also allow the entries in the static queues to be prioritized. This prioritization allows high priority transactions to be transferred from the static queues ahead of low priority transactions. Furthermore, additional index queues may be added for supporting additional priority levels.

Another advantage of queuing arrangement 10 is that index values may be transferred from one index queue to another, thus effectively reprioritizing the index value and the static queue entry with which it is associated. An index value transfer arrangement according to the invention includes a static queue comparator 60 for receiving the address stored in address latch 22 and comparing the address to the address stored in each static address queue location 12. Comparator 60 also preferably includes the availability indicator 14 from each queue location 12 in the comparison in order to ensure that only valid static queue entries produce a match. The output of comparator 60 comprises a bit mask which is used by an encoder 61 to produce a match index value. For example, assume that the address compared to the addresses in each static queue location 12 matches the address currently stored in the fifth location of static address queue 11, and further assume that the address currently stored in this fifth location is associated with a low priority transaction. The bit mask from static queue comparator 60 shows the match in the fifth location 12 and encoder 61 uses this information to produce a match index value such as binary representation "101," for example, which identifies the fifth location in static queue 11. This match index value is the same value as the index value provided by index generator 34 when the particular address was written into the fifth location 12 of static queue 11.

An index value comparator 64 is also included in the index value transfer arrangement. Index value comparator 64 receives the match index value from encoder 61 and compares the match index value with the index value in each location in the low priority index queue. Comparator 64 also preferably includes a validity bit in each low priority index queue location in the comparison to ensure only valid index values can result in a match. Since the match index value is equal to a low priority index value which was earlier stored in low priority index queue 37, index queue comparator 64 outputs a bit mask showing the match in the low priority queue location 40 holding index value associated with the fifth location 12 in static queue 11. The output from index queue comparator 64 provides an input to OR gate 66 which in turn provides one input to a transfer AND gate 67. The snoop transaction indicator provides the other input to transfer AND gate 67 and the output from this gate is applied to line 68. Both the match index value from encoder 61 and the signal on line 68 are applied to the first pipeline stage 70 of three synchronizing pipeline stages 70, 71, and 72.

One situation in which it is desirable to re-prioritize a store-type transaction involves a snoop transaction in which another processor effectively requests control of a certain address in memory. A processor may issue a snoop transaction specifying an address which is also specified in a low priority transaction, such as a castout transaction, currently held in the static queues. The snoop transaction indicates that another processor needs the data at the specified address. Thus, it would be helpful in that situation to complete the low priority store transaction more quickly so that the other processor can retrieve the data and perform its desired operation. The operation of the index value transfer arrangement and the method of reprioritizing static queue entries according to the invention will be described with reference to FIG. 1, to the timing chart shown in FIG. 3, and with reference to the above-described snoop transaction example.

Figure 3:
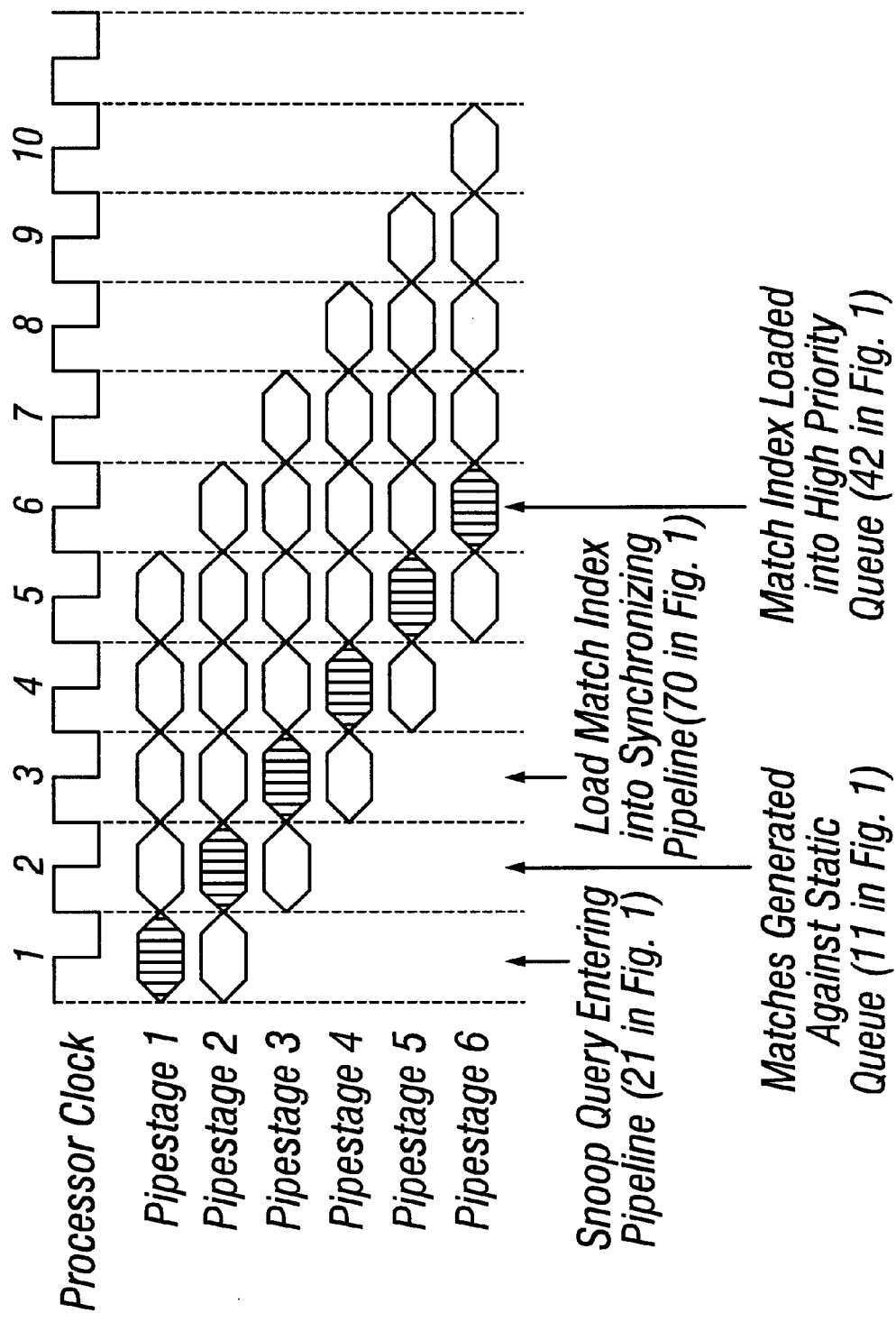
FIG. 3 is a timing chart illustrating the timing of a reprioritization operation according to the invention.

In this example, the snoop transaction, and specifically the address specified by the snoop transaction enters arbitration multiplexer 21 in the first clock cycle shown in FIG. 3 and is latched in address latch 22 in the second clock cycle. Also in the second clock cycle, the address in latch 22 is driven to static queue comparator 60 and is compared to the addresses stored in valid entries (i.e. locations 12 marked "unavailable") in static address queue 11. Assume again for purposes of describing the invention that a low priority castout transaction currently held in the fifth location 12 in static address queue 11 specifies the same address as the address specified by the snoop transaction latched at address latch 22. In this example, static queue comparator 60 produces a bit mask showing a match at the fifth static queue location 12. Encoder 61 produces a match index value, for example, the binary representation "101," and still in the second clock cycle drives the match index value to index queue comparator 64.

Index queue comparator 64 compares the match index value with the index value stored in each location 40 in low priority index queue 37, and produces an output bit mask which provides the input for OR gate 66. Assuming for the purposes of example, that the index value specifying the fifth location 12 in static queue 11 resides in the second location 40 in low priority index queue 37. The single match in the output of index queue comparator 64 causes OR gate 66 to produce an enabling output to transfer AND gate 67. Also, the snoop transaction identifier from snoop identifier latch 24 provides another enabling input to transfer AND gate 67. These two enabling inputs cause transfer AND gate 67 to drive a "validate transfer" signal on line 68. This "validate transfer" signal sets a valid bit for the index value which is transferred to the high priority queue 42.

The bit mask output from index queue comparator 64 is also applied back to low priority index queue 37 to invalidate the index value at the second location 40. This invalidation preferably comprises toggling a validity bit that location to an "invalid" status. The invalidated index value in low priority index queue 37 continues to trickle down through the queue or is overwritten by a valid index value. In any event the invalidated index value will not be selected from the low priority queue for accessing the associated address since the validity indicator indicates that the value is invalid.

In the third clock cycle shown in FIG. 3, the snoop transaction moves to the pipeline stage 26. In the same clock cycle, the match index value enters the first synchronizing pipeline stage 70 along with a valid bit set by the signal on line 68. This match index value is equivalent to the index value which identifies the fifth location 12 in static queue 11, that is, the location which holds the castout instruction being reprioritized.

In the fourth clock cycle shown in FIG. 3, the snoop transaction shifts to address pipeline stage 27, and the index value being reprioritized is transferred to synchronizing pipeline stage 71. In the fifth clock cycle shown in FIG. 2, the snoop transaction is at pipeline stage 28 and will not produce a valid entry in a location 12 in static queue 11. Thus, the fifth clock cycle shown in FIG. 3 represents a "dead" cycle for the static queue 11 in which there will be no new store-type requests for a queue location 12. Since no entry is stored in queue 11 in this "dead" cycle, index generator 34 does not produce a valid index value in the cycle. The index value transfer arrangement according to the invention takes advantage of this "dead" cycle to apply the match index value from synchronizing pipeline stage 72 through multiplexer 43 to high priority index queue 42 for storage in a location 46. Using this "dead" cycle to insert the index value being reprioritized avoids any conflict between the reprioritized index value and a new index value being provided by index generator 34.

In some cases it may be desirable to prevent an entry in the static queue 11, and any corresponding queue such as queue 16, from being transferred to the next resource in the processing system. For example, a first castout transaction already stored in the static queue location 12 may specify an address in which data is to be stored. Some time later, but before the first castout transaction is transferred from the static queue 11, arbitration multiplexer 21 may receive a second castout transaction specifying the same address as the first transaction. In this case, there is no need to execute the first castout transaction since the second transaction will simply overwrite the data at the specified address when the second castout instruction is completed. Thus, is desirable to prevent the first transaction from exiting static queue 11 to be completed.

To prevent selected static queue entries from being transferred from the static queue 11, the preferred form of the invention includes a queue compacting arrangement. The queue compacting arrangement includes the static queue comparator 60, encoder 61, and the index queue comparator 64, each also used in the index value transfer arrangement. The queue compacting arrangement also includes AND gate 75 connected to receive as inputs the bit mask from the static queue comparator and the state stored in store transaction identifier latch 23. This latter input to AND gate 75 functions as an enabling signal which enables the AND gate to output the bit mask received from comparator 60.

The operation of the compacting arrangement may be described with reference to an exemplary case in which the entry which is to be removed (the "first entry" described above) is stored in the fifth static address queue location 12 identified by index value "101." The second store-type transaction enters the queuing arrangement 10 through arbitration multiplexer 21 and is latched at address latch 22. In the same clock cycle in which the second transaction address is latched at latch 22, the specified address is applied to static queue comparator 60 and compared to the address stored in each valid static queue location 12. This comparison produces a bit mask showing a match at the fifth location 12, and the bit mask is applied an AND gate 75. AND gate 75 also receives the store transaction identifier flag which represents an enabling signal to the gate. The bit mask is thus driven through AND gate 75 and applied back to static address queue 11 to change the availability status of the fifth location 12 to an "available" status.

The bit mask from static queue comparator 60 is also applied to encoder 61 where it is encoded to binary index value "101." Encoder 61 then applies this match index value to index queue comparator 64 where it is compared to the index values in each location 40 of the low priority index queue 37. The resulting bit mask includes one bit which indicates a match between the match index value provided by encoder 61 and the index value previously stored in low priority index queue 37 when the associated static queue entry was made in static queue 11. Although this match causes and enabling output to transfer AND gate 67, the absence of a snoop transaction identifier prevents the transfer AND gate from driving a "validate transfer" signal on line 68 and thus the match index value from encoder 61 is not validated in the synchronizing pipeline stage 70. However, the bit mask output from index queue comparator 64 is applied back to low priority index queue 37 to toggle the validity indicator associated with the stored index value to an "invalid" status. This invalid status prevents the stored index value from being selected to access the associated static queue location 12, in this case the fifth location which has been marked as available for a new entry.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A queuing apparatus associated with a processor, the queuing apparatus comprising:
   (a) a static queue having a plurality of static queue locations, each static queue location for storing a static queue entry and having an availability indicator for indicating an availability status of the respective static queue location;
   (b) an index generator associated with the static queue, the index generator for providing a unique index value for each static queue entry, the index value for a particular static queue entry identifying the static queue location containing the particular static queue entry;
   (c) at least one index queue, each index queue having a plurality of index queue locations and each index queue location for storing one of the index values provided by the index generator; and
   (d) a static queue accessing arrangement for (i) retrieving a selected index value from a particular index queue location, (ii) using the selected index value to retrieve the static queue entry with which the selected index value is associated, and (iii) changing the availability status of the static queue location which stored the retrieved static queue entry, the availability status being changed to an available status.

2. The queuing apparatus of claim 1 wherein each index value is associated with one of a plurality of priority levels, and further comprising:
   (a) one index queue for each priority level, each index queue for storing index values associated with a particular one of the priority levels.

3. The queuing apparatus of claim 2 further comprising:
   (a) index queue selection logic for selecting one of the index queues to access the index value stored in the selected index queue location in that particular index queue.

4. The queuing apparatus of claim 1 further comprising:
   (a) index queue location selection logic for selecting the particular index queue location.

5. The queuing apparatus of claim 1 further comprising:
   (a) an index queue transfer arrangement for transferring an identified index value from one index queue to a different index queue.

6. The queuing apparatus of claim 5 wherein the index queue transfer arrangement comprises:
   (a) a static queue comparator arrangement for receiving a snoop transaction and identifying a snoop matching static queue entry, the snoop matching static queue entry comprising a static queue entry which matches the received snoop transaction;
   (b) an index queue comparator arrangement for locating the identified index value in a first index queue, the identified index value comprising the particular index value associated with the snoop matching static queue entry;

(c) an index queue invalidating arrangement associated with the first index queue, the index queue invalidating arrangement for invalidating the identified index value in the first index queue; and (d) a transfer control arrangement for receiving the identified index value from the index queue comparator arrangement and for storing the identified index value in a second, higher priority index queue.

7. The queuing apparatus of claim 6 further comprising:

(a) a synchronizing arrangement associated with the transfer control arrangement, the synchronizing arrangement for ensuring that the identified index value is stored in the second index queue during a clock cycle in which no new entry is stored in the static queue.

8. The queuing apparatus of claim 1 wherein the static queue comprises a first static queue and further comprising:

(a) a plurality of additional static queues each additional static queue having a queue location which (i) corresponds to a static queue location in the first static queue and (ii) is identified by the respective index value associated with the corresponding static queue location in the first static queue.

9. The queuing apparatus of claim 1 further comprising:

(a) a queue compacting arrangement for invalidating a duplicate transaction index value from a first index queue, the duplicate transaction index value indicating a static queue entry for a duplicate transaction.

10. The queuing apparatus of claim 9 wherein the index queue compacting arrangement comprises:

(a) a static queue comparator arrangement for receiving a transaction specifier and for identifying a duplicate static queue entry, the duplicate static queue entry comprising a static queue entry which matches the received transaction specifier;

(b) an index queue comparator arrangement associated with the first index queue for identifying a matching index value in the first index queue, the matching index value comprising the particular index value associated with the duplicate static queue entry;

(c) an index queue location invalidating arrangement associated with the first index queue, the index queue location invalidating arrangement for invalidating the identified index value in the first index queue;

(d) a static queue canceling arrangement for invalidating the duplicate static queue entry.

11. A static queue control method comprising the steps of:

(a) storing a plurality of static queue entries in a static queue, each static queue entry being stored in a different static queue location in the static queue, and each static queue entry including an availability indicator indicating an availability status for the respective static queue location;

(b) generating a unique index value for each static queue entry, the index value for a particular static queue entry identifying the static queue location containing the particular static queue entry;

(c) storing each index value in a different index queue location in an index queue;

(d) retrieving a selected index value from one of the index queue locations; and (e) using the selected index value to retrieve the static queue entry with which the selected index value is associated.

12. The method of claim 11 further comprising the step of:

(a) changing the availability status of the retrieved static queue entry to an available status.

13. The method of claim 11 wherein:

(a) each index value is associated with one of a plurality of relative priorities;

(b) separate index queues are provided for storing index values of like relative priority; and (c) the step of storing a particular index value includes the step of selecting one of the index queues according to the relative priority with which the particular index value is associated.

14. The method of claim 13 wherein the step of retrieving the selected index value includes:

(a) choosing one of the index queues based upon the relative priority of the index values for which the respective index queue is reserved.

15. The method of claim 11 further comprising the step of:

(a) transferring an identified index value from one index queue to a different index queue, the different index queue being reserved for index values associated with a different relative priority.

16. The method of claim 15 wherein the step of transferring the identified index value includes the steps of:

(a) receiving a snoop transaction;

(b) identifying a snoop matching static queue entry, the snoop matching static queue entry comprising a static queue entry which matches the received snoop transaction;

(c) locating the identified index value in a first index queue, the identified index value comprising the particular index value associated with the snoop matching static queue entry; and (d) invalidating the identified index value in the first index queue.

17. The method of claim 16 wherein the step of transferring the identified index value further includes the steps of:

(a) passing the identified index value through a synchronizing arrangement to ensure that the identified index value is stored in the different index queue during a clock cycle in which no new entry is stored in the static queue.

18. The method of claim 11 further comprising the steps of:

(a) invalidating a duplicate transaction index value from a first index queue, the duplicate transaction index value identifying the static queue entry for a duplicate transaction; and (b) invalidating the static queue entry for the duplicate transaction.

19. The method of claim 18 wherein the step of invalidating the duplicate transaction index value includes the steps of:

(a) receiving a transaction specifier;

(b) identifying a duplicate static queue entry, the duplicate static queue entry comprising a static queue entry which matches the received transaction specifier; and (c) identifying the duplicate transaction index value in the first index queue, the duplicate transaction index value comprising a particular index value associated with the duplicate static queue entry.

20. A queuing apparatus associated with a processor, the queuing apparatus comprising:

(a) a static queue having a plurality of static queue locations, each static queue location for storing a static queue entry and having an availability indicator for indicating an availability status of the respective static queue location;

(b) an index generator associated with the static queue, the index generator for providing a unique index value for each static queue entry, each index value being associated with one of a plurality of priority levels, the index value for a particular static queue entry identifying the static queue location containing the particular static queue entry;

(c) a plurality of index queues, one index queue for each of the plurality of priority levels, each index queue having a plurality of index queue locations and each index queue location for storing one of the index values provided by the index generator, each respective index queue being reserved for index values associated with a single one of the priority levels; and (d) a static queue accessing arrangement for (i) retrieving a selected index value from a particular index queue location, and (ii) using the selected index value to retrieve the static queue entry with which the selected index value is associated.

21. The queuing apparatus of claim 20 further comprising:

(a) an index queue transfer arrangement for transferring an identified index value from one index queue to a different index queue.

22. The queuing apparatus of claim 21 wherein the index queue transfer arrangement comprises:

(a) a static queue comparator arrangement for receiving a snoop transaction and identifying a snoop matching static queue entry, the snoop matching static queue entry comprising a static queue entry which matches the received snoop transaction;

(b) an index queue comparator arrangement for locating the identified index value in a first index queue, the identified index value comprising the particular index value associated with the snoop matching static queue entry;

(c) an index queue invalidating arrangement associated with the first index queue, the index queue invalidating arrangement for invalidating the identified index value in the first index queue; and (d) a transfer control arrangement for receiving the identified index value from the index queue comparator arrangement and for storing the identified index value in a second, higher priority index queue.

23. The queuing apparatus of claim 22 further comprising:

(a) a synchronizing arrangement associated with the transfer control arrangement, the synchronizing arrangement for ensuring that the identified index value is stored in the second index queue during a clock cycle in which no new entry is stored in the static queue.

24. The queuing apparatus of claim 20 further comprising:

(a) an index queue compacting arrangement for invalidating a duplicate transaction index value from one of the index queues, the duplicate transaction index value indicating a static queue entry for a duplicate transaction.

25. The queuing apparatus of claim 24 wherein the index queue compacting arrangement comprises:

(a) a static queue comparator arrangement for receiving a transaction specifier and for identifying a duplicate static queue entry, the duplicate static queue entry comprising a static queue entry which matches the received transaction specifier;

(b) an index queue comparator arrangement for identifying a matching index value in a first index queue, the matching index value comprising the particular index value associated with the duplicate static queue entry;

(c) an index queue location invalidating arrangement associated with the first index queue, the index queue location invalidating arrangement for invalidating the identified index value in the first index queue; and (d) a static queue location invalidating arrangement for invalidating the duplicate static queue entry.

* * * * *